(12) United States Patent
Pala et al.

(10) Patent No.: US 7,520,241 B2
(45) Date of Patent: Apr. 21, 2009

(54) LCD DISPLAY AND GAUGE WITH BELT OR CABLE DRIVEN POINTER

(75) Inventors: Silviu Pala, Birmingham, MI (US); Scott Heflin, Waterford, MI (US)

(73) Assignee: DENSO Corporation, Southfield, MI (US)

( * ) Notice: Subject to any disclaimer, the term of this patent is extended or adjusted under 35 U.S.C. 154(b) by 112 days.

(21) Appl. No.: 11/657,975

(22) Filed: Jan. 25, 2007

(65) Prior Publication Data

US 2008/0178792 A1     Jul. 31, 2008

(51) Int. Cl.
*G01D 11/28*   (2006.01)
*G01D 13/22*   (2006.01)
*G12B 11/04*   (2006.01)

(52) U.S. Cl. ................ 116/62.1; 116/288; 116/DIG. 6; 116/DIG. 36

(58) Field of Classification Search ................ 116/284, 116/286–289, 293, 300–303, 305, 327–329, 116/331, 332, DIG. 6, DIG. 36, 62.1–62.4
See application file for complete search history.

(56) References Cited

U.S. PATENT DOCUMENTS

| | | | | | |
|---|---|---|---|---|---|
| 1,735,972 | A | * | 11/1929 | Martini | 116/245 |
| 2,123,376 | A | * | 7/1938 | Moeger | 73/866.3 |
| 2,932,274 | A | * | 4/1960 | Wennerstrom | 116/328 |
| 4,194,587 | A | * | 3/1980 | Shino et al. | 180/90 |
| 5,201,277 | A | * | 4/1993 | Aoki et al. | 116/286 |
| 6,082,288 | A | * | 7/2000 | Kato et al. | 116/286 |
| 6,484,663 | B2 | * | 11/2002 | Zech et al. | 116/284 |
| 6,490,992 | B2 | * | 12/2002 | Olbrich et al. | 116/288 |
| 6,606,961 | B1 | * | 8/2003 | Noll et al. | 116/288 |
| 7,159,534 | B2 | * | 1/2007 | Tanaka et al. | 116/300 |
| 7,347,160 | B2 | * | 3/2008 | Honma et al. | 116/288 |
| 7,347,575 | B2 | * | 3/2008 | Fong et al. | 362/23 |
| 7,370,603 | B2 | * | 5/2008 | Balsfulland et al. | 116/288 |
| 2002/0174733 | A1 | * | 11/2002 | Rothermel | 73/866.3 |
| 2006/0012971 | A1 | * | 1/2006 | Fong et al. | 362/23 |
| 2007/0040697 | A1 | * | 2/2007 | Suess et al. | 340/688 |
| 2008/0115717 | A1 | * | 5/2008 | Fournier | 116/288 |

\* cited by examiner

Primary Examiner—Amy Cohen Johnson
(74) Attorney, Agent, or Firm—Harness, Dickey & Pierce, PLC

(57) ABSTRACT

An indicating instrument such as a speedometer has a numerical scale, a belt and a pointer attached to the belt to indicate different scale positions. A display, such as an LCD, may lie within the inner confines of the perimeter of the dial, which may be formed in a variety of shapes. A motor-driven pulley drives the belt to move the pointer around the LCD and to various scale positions. A light source within the pointer may illuminate the pointer, while a separate pointer support structure about the numerical scale may support the pointer from underneath. The belt may be a continuous loop about one spool or a separate, spring-loaded bobbin may be used with the spool to coil and uncoil the belt. An electrically conductive, tensioning post may supply electricity to the belt and the lighted pointer. Teeth on the spool may coincide with perforations in the belt.

15 Claims, 5 Drawing Sheets

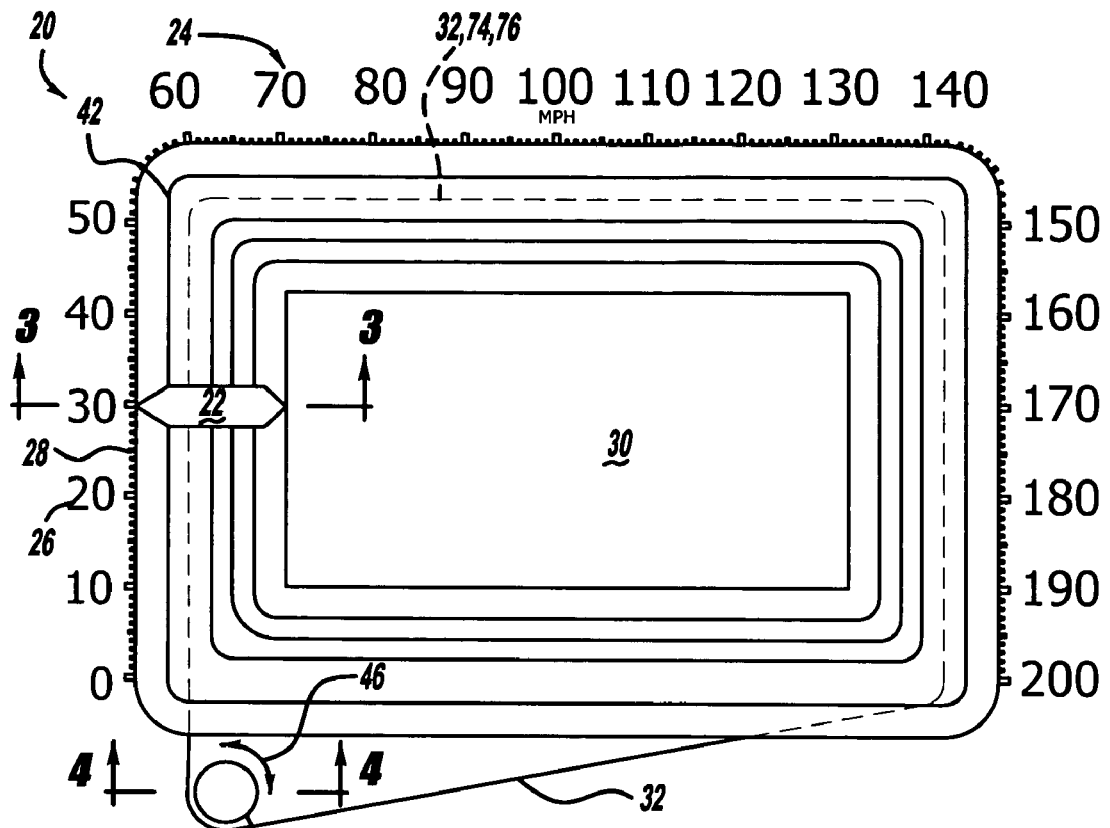
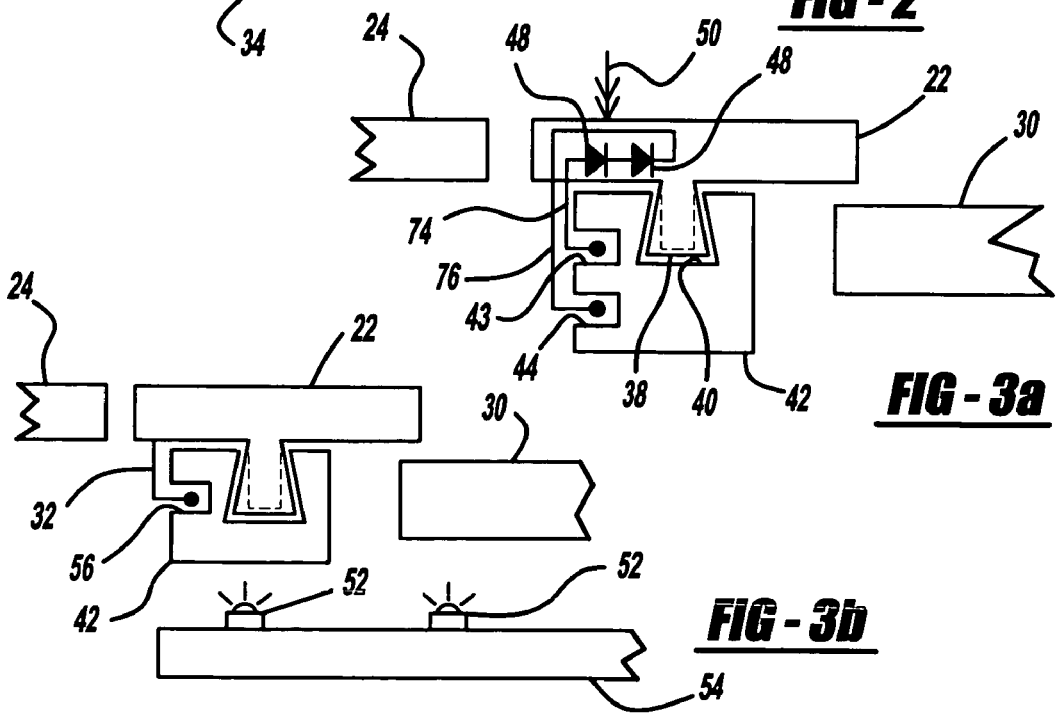
FIG - 2
FIG - 3a
FIG - 3b

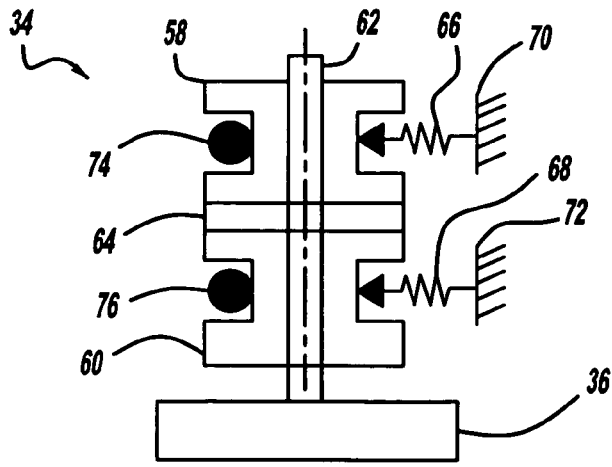
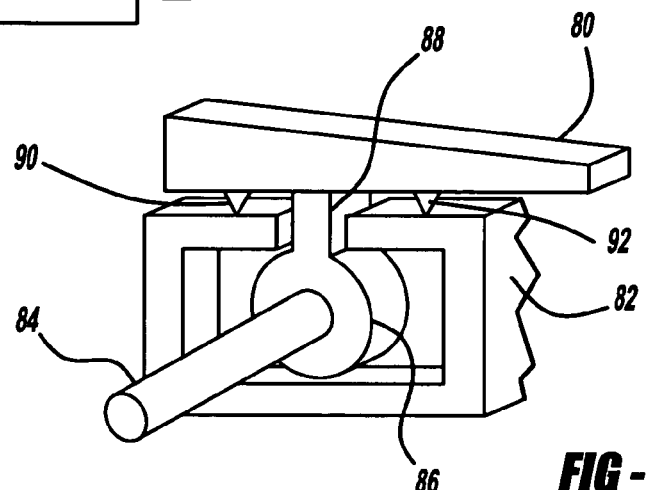
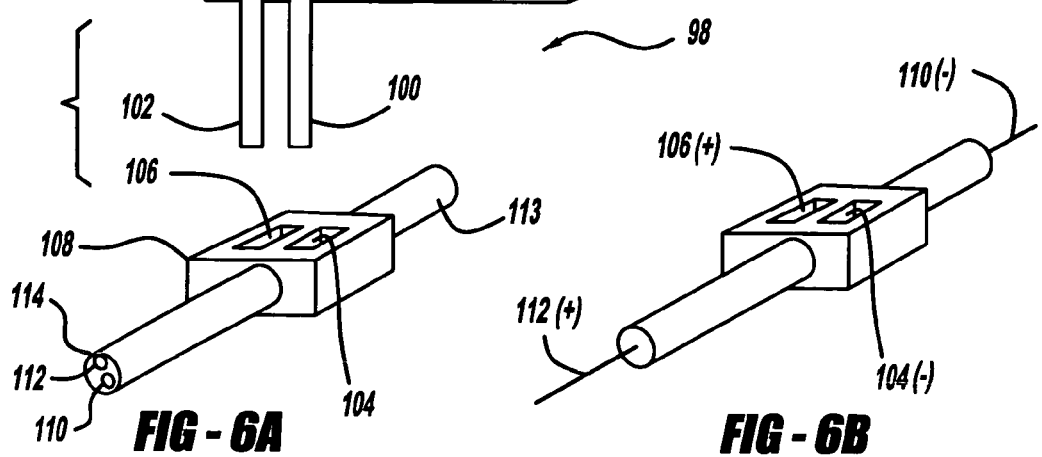

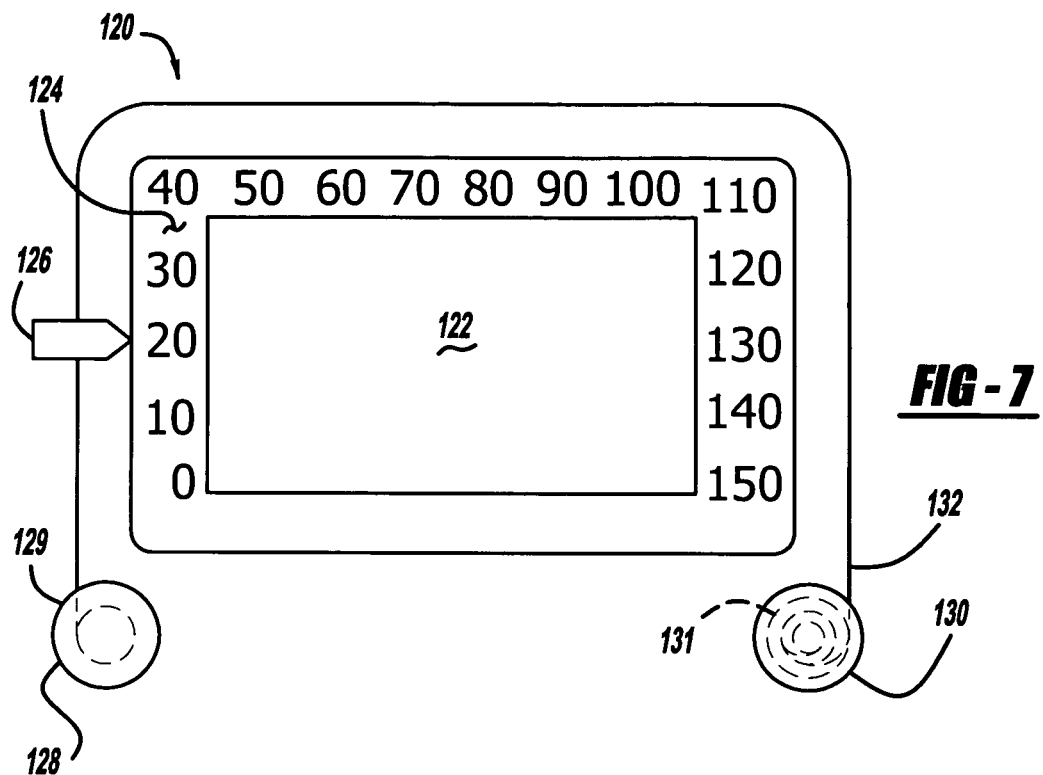
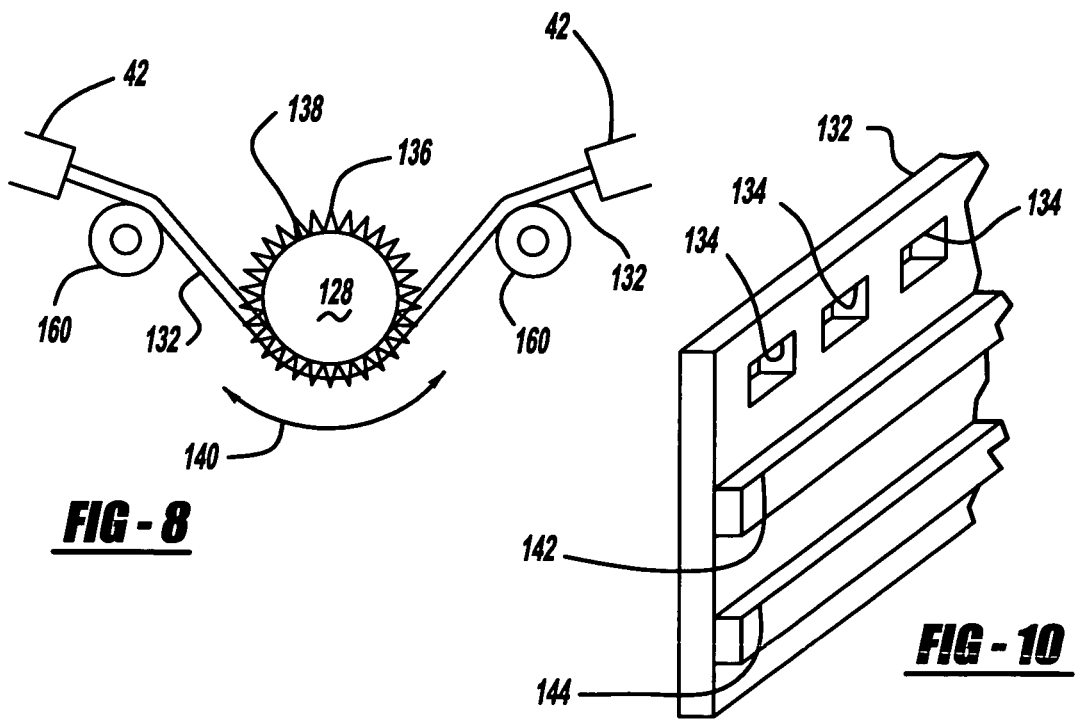

LCD DISPLAY AND GAUGE WITH BELT OR CABLE DRIVEN POINTER

FIELD

The present disclosure relates to an indicating instrument with a moving pointer and a light guide. More specifically, the disclosure relates to a belt or cable driven pointer that moves between or around a liquid crystal display and a scale.

BACKGROUND

The statements in this section merely provide background information related to the present disclosure and may not constitute prior art. Indicating instruments such as gauges for viewing by drivers of vehicles generally include an analog portion for displaying operational information such as vehicle speed, and in more recent technologically advanced vehicles, a liquid crystal display for displaying information related to vehicle operating conditions such as fuel efficiency, outside temperature, engine and transmission functions, and other information related to driving or vehicle conditions. An analog gauge typically includes a faceplate having indicia adjacent a scale to denote levels of the scale and a pointer for rotating to the indicia and scale numbers, such as mile per hour ("mph") markings. While such analog indicating instruments and liquid crystal displays have generally proven satisfactory for their intended purposes, they have been associated with their share of limitations.

One such limitation of current vehicles with both analog and liquid crystal display devices relates to their packaging in a vehicle dash. Because such analog and LCD devices are normally located in separate, side-by-side locations on a vehicle dash, extensive amounts of dash space are required which leaves a limited area of dash space for locating other gauges, such as analog temperature, fuel, and tachometer gauges, as examples.

Another limitation of current vehicles employing both analog and liquid crystal display devices is also related to vehicle packaging. More specifically, because incorporating analog and LCD devices within a vehicle dash presently means locating such devices in separate areas of the dash, even if they are adjacent to each other, the time necessary for a driver to view both, the analog gauge and an LCD, and the human movements required to view both, may be cumbersome or timely inefficient for a vehicle driver to quickly view both components.

What is needed then is a device that does not suffer from the above disadvantages. This, in turn, will provide an analog and an LCD device that is efficiently packaged for a vehicle dash, that is timely efficient for a driver to view, and that does not require extensive head or eye movements as a driver views such devices.

SUMMARY

An indicating instrument, such as a speedometer, may utilize a numerical scale, a belt or cable and a pointer, which may attach to the belt or cable to indicate different scale positions. A display, such as an LCD, may be located within or inside the perimeter of the numerical scale and display text or other symbolic information related to vehicle functions, temperature, fuel economy, etc. A motor may drive a pulley to rotate the pulley and move the belt or cable, which contacts the pulley, such that the pointer moves about the speedometer scale to indicate increasing or decreasing speeds, for example. A light source, such as an LED, may be located within the pointer to illuminate the pointer. Electricity to power the LED or light source, may be provided through an electrically conductive pulley which powers the LED using wires or an electrically conductive belt or cable. Such a belt may have copper, conductive portions.

A separate pointer support structure may be used to support the pointer from under the pointer, adjacent to the numerical scale, to permit the pointer to traverse on either side of the numerical scale, yet outside the perimeter of the LCD. A tongue and groove arrangement between the pointer and pointer support structure permits the pointer to move atop the pointer support structure while the pointer is attached to a belt, cable or wire. Alternatively, at least one prong on the pointer may insert into a receptacle on the belt, cable or wire to facilitate connection to the belt, cable or wire.

An electrically-conductive spool is supplied electricity from a printed circuit board using connectors or blades to permit an electrically-conductive belt, cable or wire to receive such electricity from the spool and supply electricity to the pointer LED. The flexible belt may have copper-plated protrusions to conduct the electricity and have perforations that coincide with teeth on a drive pulley to drive the cable. On either side of the drive pulley, electrically conductive tensioning posts may be employed to impart tension in the rotating belt and supply electricity to the copper protrusions of the flexible belt. Thus, one pulley rotated by a motor may be used to drive the belt.

In an alternate arrangement, a motor-driven pulley and a spring-loaded bobbin may be used on opposite ends of a scale to wind and unwind the belt to invoke movement of the pointer. In such an arrangement, the motor-driven pulley may supply the necessary electricity to power a pointer LED via the electrically-conductive belt.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 2 is a front view of an indicating instrument constructed in accordance with an embodiment of the present invention;

FIG. 3a is a cross-sectional view of an embodiment of the indicating instrument of FIG. 2;

FIG. 3b is a cross-sectional view of an embodiment of the indicating instrument of FIG. 2;

FIG. 4 is a cross-sectional view of a motor and pulleys to drive and supply electricity to a pointer;

FIG. 5 is a perspective view of an embodiment of a belt or cable and pointer device in accordance with an embodiment of the invention;

FIG. 6a is a perspective view of an embodiment of a belt or cable and pointer device in accordance with an embodiment of the invention;

FIG. 6b is a perspective view of an embodiment of a belt or cable and pointer device in accordance with an embodiment of the invention;

FIG. 7 is a front view of an indicating instrument constructed in accordance with an embodiment of the present invention;

FIG. 8 is a top view of a pointer driving mechanism in accordance with an embodiment of the present invention;

FIG. 10 is a perspective view of a flexible cable in accordance with an embodiment of the present invention;

DETAILED DESCRIPTION

Figure 1:
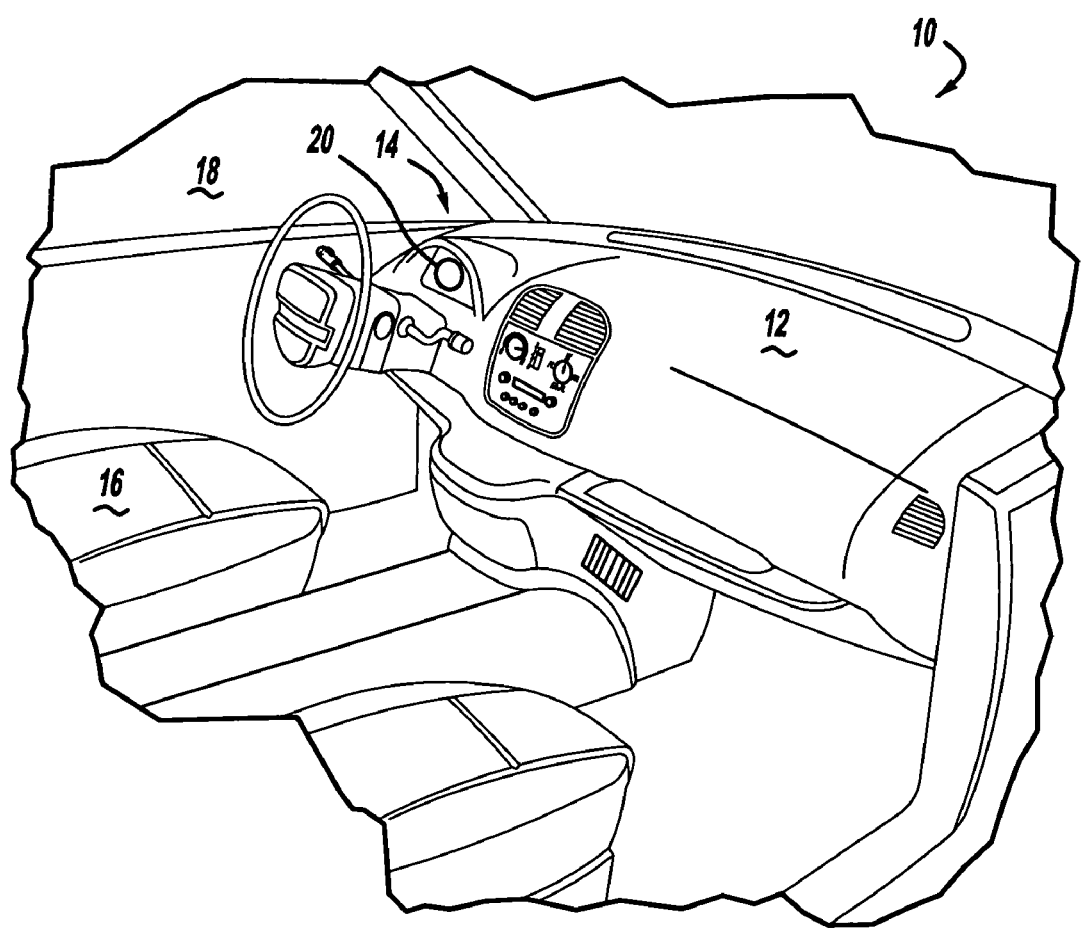
FIG. 1 is a perspective view of an interior dash of a vehicle depicting a location of an indicating instrument.

The following description is merely exemplary in nature and is not intended to limit the present disclosure, application, or uses. It should be understood that throughout the drawings, corresponding reference numerals indicate like or corresponding parts and features. Turning now to FIGS. 1-12, the teachings of the present invention will be explained. With initial reference to FIG. 1, depicted is a vehicle 10 having a dash 12 and an instrument cluster 14, both of which may be situated in front of a driver's seat 16 in the interior cabin 18 of a vehicle 10. As part of the instrument cluster 14, a viewed component 20 is depicted and hereinafter, the viewed component 20, also known as an indicating instrument or gauge, is exemplified by a speedometer. It is appreciated that the viewed component 20 may be exemplified by other gauges or instruments, such as, but not limited to, a tachometer.

Turning now to FIG. 2, a speedometer 20 is depicted as the viewed component. More specifically, the speedometer 20 has a pointer 22 that traverses about a scale 24 to indicate different scale positions, or indicia 26 denoted by graduations 28. Within the perimeter of the scale 24 lies a display 30, such as a liquid crystal display ("LCD"), an organic light emitting diode ("OLED") display, etc; however, for purposes of the description of the invention, an LCD will be used. Continuing, within or inside the perimeter of the scale 24 lies an LCD 30 that may be used for displaying information such as, but not limited to, outside temperature, fuel economy, engine diagnostics, present gear selection of the transmission, doors ajar, etc. Such scale positioning results in an advantage of the present invention; because the scale 24 may be located around or outside of the perimeter of the LCD 30 dash space is conserved for other gauges. Stated another way, the scale 24 and LCD 30 arrangement of FIG. 2 eliminates the need to locate a complete, separate speedometer beside an LCD screen. Another advantage is that a viewer may quickly look at the LCD 30 and scale 24 while driving without having to move his or her head, only his or her eyes. Furthermore, the length of time needed to view both the scale 24 and position of the pointer 22, and the LCD 30 is reduced because head and eye movements are reduced when compared to side by side components.

Continuing with FIGS. 2-4, the pointer 22 traverses about the scale 24 by employing a top wire 74 and a bottom wire 76 (FIG. 3a) that is moved by a pulley 34 driven by a motor 36 (FIG. 4). More specifically, and with reference primarily to FIG. 3a, the pointer 22 has a tongue 38 that fits within a groove 40 of the support structure 42. As depicted, the tongue 38 may be trapezoidal or triangular in shape to fit within a trapezoidal or triangular groove 40. Alternatively, the tongue and groove may both be rectangular in shape. The wires 74, 76 may fit within additional grooves 43, 44 in the support structure 42 and pull the pointer 22 around the scale 24 as the pulley 34 turns either clockwise or counterclockwise in accordance with the arrow 46 (FIG. 2). To accommodate movement of the pointer 22 on and in the supporting structure 42, the pointer 22 and supporting structure 42 may be made of a variety of transmissive plastic materials that have low coefficients of friction and that also act as electrical insulators. Continuing with FIG. 3a, to move around the scale 24 and LCD 30, the pointer 22 slides along the top and within the groove 40 of the support structure 42. The pointer 22 may be lighted by one or more LEDs 48, which receive electricity from the wires 74, 76, as it traverses the scale 24 on the supporting structure 42. The LED 48 may reside within the pointer 22 to illuminate, as represented by light rays 50, the pointer 22. The support structure 42 may be a rigid, light transmissive structure that is situated beyond or outside of the perimeter of the LCD 30 and under the pointer 22.

Before presenting several configurations of the various parts that are the present invention, an explanation of a driving part will be provided. More specifically, the wires 74, 76 may be solid, yet pliable members that are electrically conductive; alternatively, smaller, individual twisted wire strands may be combined to arrive at a desirable cross-sectional diameter of wires 74, 76. In effect, such twisted strands would form a cable structure that is also electrically conductive. However, for some pointer applications, as will be described using FIG. 3b, electrically conductive materials may not be required.

Turning now primarily to FIG. 3b, another embodiment of a pointer is depicted. Instead of being illuminated by one or more LEDs 48 within the pointer 22 as depicted in FIG. 3a, the pointer 22 may be illuminated by a light source, such as an LED 52, situated on a printed circuit board 54 ("PCB"). In such an arrangement, the LED 52 lights the transmissive support structure 42 and pointer 22, which traverses about the scale 24 and LCD 30 using a tongue and groove arrangement 56, similar to the structure of FIG. 3a. Continuing with FIG. 3b, the multiple LEDs 52 also provide backlighting to the LCD 30 and light the pointer 22, which may be transmissive, opaque or translucent. Since the pointer of FIG. 3b does not contain electrical components, such as an LED, a single cable or wire 32 may be used to move the pointer around the periphery of the LCD 30. Alternatively, because electrical conductivity is not necessary, non-conductive materials such as rubber or other materials may be used as a belt or cable.

Turning now to FIG. 4, an example of the pulley 34 that may facilitate movement of the pointer 22 about the LCD 30 is depicted. More specifically, the pulley 34 has a top pulley 58 and a bottom pulley 60 such that they together rotate either clockwise or counterclockwise on a shaft 62 driven by motor 36. Because the top pulley 58 and bottom pulley 60 each carry an electrically charged wire, an insulator 64 is positioned between the pulleys 58, 60. More specifically, as an example, the top pulley 58 obtains a positive electrical charge via a conductive top spring 66 while the bottom pulley 60 obtains a negative electrical charge via a conductive bottom spring 68. As depicted, the springs 66, 68 may be biased from one or more adjoining structures 70, 72. The top pulley 58, made of an electrically conductive material that receives its electrical charge through the spring 66, contacts the top conductive wire 74, while the bottom pulley 60, made of an electrically conductive material that receives its electrical charge through the spring 68, contacts the bottom conductive wire 76. Together the top conductive wire 74 and the bottom conductive wire 76 supply electricity to, as an example, the wires 74, 76 in the cross-section of the pointer 22 and supporting structure 42 depicted in FIG. 3a.

In the event that electrical power is not necessary to power an LED or other light source in the pointer 22, only one hub, such as pulley 60, is necessary to move the pointer 22 of FIG. 3b. More specifically, structures related to electricity distribution in FIG. 4, are not necessary when a pointer without an internal light source, such as an LED, is employed.

Turning now to FIG. 5, another embodiment of a pointer 80 and associated structure is depicted. More specifically, the pointer 80 slides upon and within a support structure 82 using a guide wire 84, cable or belt that is connected to the pointer 80 by a connector 86. The connector 86 is a circular piece as depicted in FIG. 5, and has an associated stem 88. With the pointer 80 firmly secured to the wire 84, the pointer 80 is able to be pulled around the periphery of the LCD 30 of an indicating instrument 20, as depicted in FIG. 2. First and second tabs 90, 92 of the pointer 80 may be used to stabilize the pointer 80 upon the support structure 82 as the pointer 80 traverses around the scale 24. The pointer 80 and support structure 82 may be light conducting to permit light from an LED on a PCB to pass into and through the pointer 80 and support structure 82 to illuminate such structures.

FIG. 6a depicts another embodiment of a pointer structure in which a pointer 94 containing an LED 96 plugs into a connector, such as the two-pin connector 98 depicted in FIG. 6a. The two-pin connector 98 has a first pin 100 and a second pin 102, which insert into a first hole 104 and a second hole 106 within a connector block 108 or receptacle. After insertion of the first and second pins 100, 102 into the first and second holes 104, 106, a first wire 110 contacts the first pin 100 within the first hole 104 while a second wire 112 contacts the second pin 102 within the second hole 106. The first and second wires 110, 112 together form an electrical cable 113 shielded by an insulating jacket 114. The embodiment of FIG. 6a may lie within the structure 82 of FIG. 5. Additionally, the pointer 94 may employ tabs such as the table 90, 92 depicted on the pointer 80 of FIG. 5. FIG. 6b depicts an alternative arrangement of the electrical wiring of the connector block 108. More specifically, FIG. 6b depicts a first hole 104 that is negative in electrical charge and that connects to wire 110, while a second hole 106 that is positive in electrical charge connects to wire 112. The connector block of FIG. 6b connects to the pointer 94 in the same manner as in FIG. 6a.

Turning now to FIG. 7, another arrangement of an indicating instrument 120, such as a speedometer, is depicted in FIG. 7. More specifically, the speedometer 120 generally has an LCD 122, a scale 124 that depicts speeds such as miles per hour, a pointer 126, and a motor 128 under a spool 129. However, the speedometer 120 of FIG. 7 also depicts a bobbin 130, which may be spring-loaded and operate in conjunction with the motor 128 and spool 129 in which a flexible belt, wire or cable 132 may be employed to wind and unwind the cable from the spool 129 and bobbin 130 to move an attached pointer 126 around the dial 124.

Continuing with FIG. 7, a spring 131 may reside within or around the bobbin 130 to provide constant clockwise biasing, or rotation tension, to the bobbin 130 which in turn maintains constant tension on the cable 132. With such constant tension on the belt 132, the motor 128 simply has to unwind, or rotate clockwise, to move the pointer 126 clockwise around the dial 124. The spring 131 may provide a force such that tension is always maintained in the belt 132. Similarly, when the motor 128 rotates counterclockwise to move the pointer 126 to a lower speed on the scale 124, the spring 131 within the bobbin 130 continuously provides tension to the belt 132 because of the continuous clockwise biasing of the spring 131 on the bobbin 130. Thus, the motor 128 overcomes the spring force supplied by the bobbin 130.

It is conceivable that a smooth spool 129 or a spool 129 equipped with teeth 136, may be employed; likewise, a bobbin configured with teeth may also be employed. If spools and bobbins are equipped with teeth, a belt with corresponding perforations may be employed. Such a belt 132 is depicted in FIG. 10. An advantage of employing a belt 132 with perforations 134 (FIG. 10) in conjunction with corresponding teeth on a spool 129 and bobbin 130 is that slippage of the belt may be eliminated. This may result in more accurate readings of the pointer against the scale 124, especially if quick spool motor 128 accelerations occur.

FIG. 8 depicts a motor 128 and pulley 138 arrangement that may be utilized to move a pointer around a dial when a continuous belt is employed. More specifically, FIG. 2 depicts a belt arrangement in which the motor 128 and pulley 138 of FIG. 8, and the belt 132 of FIG. 10 may be used. Continuing, the pulley 138 of FIG. 8 may pull a belt 132 around the scale 24, for example, in either a clockwise or counterclockwise direction. Teeth 136 on the pulley 138 may be used within the perforations 134 to facilitate pulling of the belt 132 around the scale 24.

Although the motor 128 and pulley 138 arrangement has been described as being suitable for the continuous loop style of pointer movement device depicted in FIG. 2, a similar motor 128, spool and teeth 136 arrangement may be employed on the embodiment depicted in FIG. 7. More specifically, although the spool 129 depicted with the motor 128 in FIG. 7 does not depict teeth, such employment is possible if a flexible cable 132 such as is depicted in FIG. 10 is utilized. Furthermore, the motor 128 and pulley 138 arrangement of FIG. 8 may employ at lease one electricity transmitting and belt tensioning post 160, hereinafter, "post 160," to be explained later.

Figure 9:
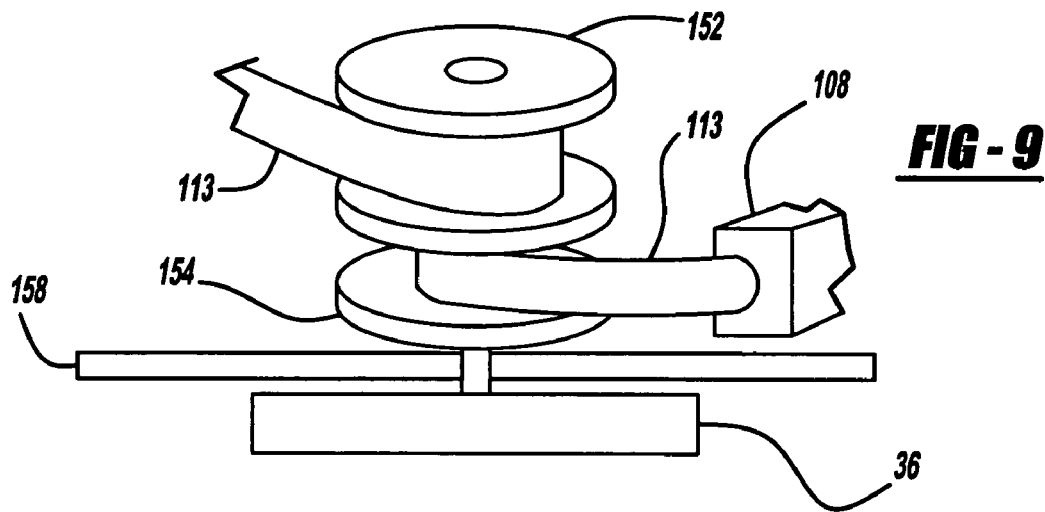
FIG. 9 is a perspective view of a cable winding mechanism in accordance with an embodiment of the present invention.

FIG. 9 depicts use of a flexible belt 113 that winds and unwinds around an upper spool 152 and a lower spool 154 to move a pointer, such as that depicted in FIG. 2, either clockwise or counterclockwise around the LCD 30 to various scale 24 positions by invoking the rotary motion of the motor 36. With the spool and cable arrangement depicted in FIG. 9, the pointers 22 may be equipped with one or more LEDs as depicted in FIG. 6a because the cable 113 may be electrically equipped. More specifically, the upper spool 152 is accompanied by a lower spool 154, which supplies the electrical connection to light the pointer 94 (FIG. 6a). The cable 113 draws its electrical energy from the printed circuit board 158 ("PCB") through the upper spool 152 and the lower spool 154.

FIG. 10 depicts details of one example of a flexible belt 132 in which a multitude of through-hole perforations 134 reside in a straight-line fashion to coincide with gear teeth 136 on a pulley 138, such as depicted in FIG. 8. The motor 128 drives the belt 132 to move the pointer 126 clockwise and counterclockwise around the LCD 30 (FIG. 2) in accordance with direction arrow 140. Continuing with the drive belt 132, in one example, the perforations 134 are located along a top area of the belt while protrusions, such as upper protrusions 142 and lower protrusions 144, both which may be copper plated to conduct electricity and prevent oxidation, are located below the perforations 134.

Figure 11:
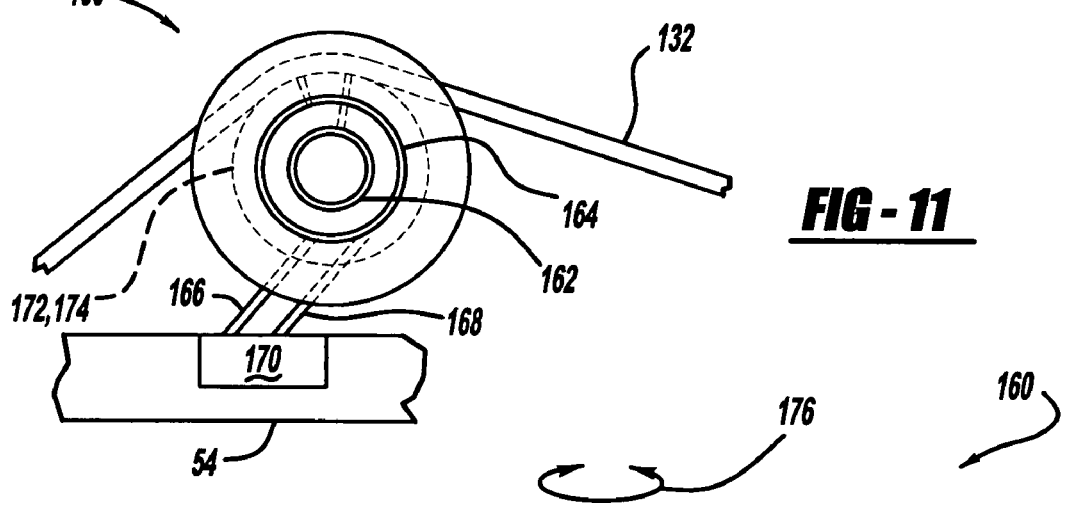
FIG. 11 is a top view of a pulley, cable and tensioning device.
Figure 12:
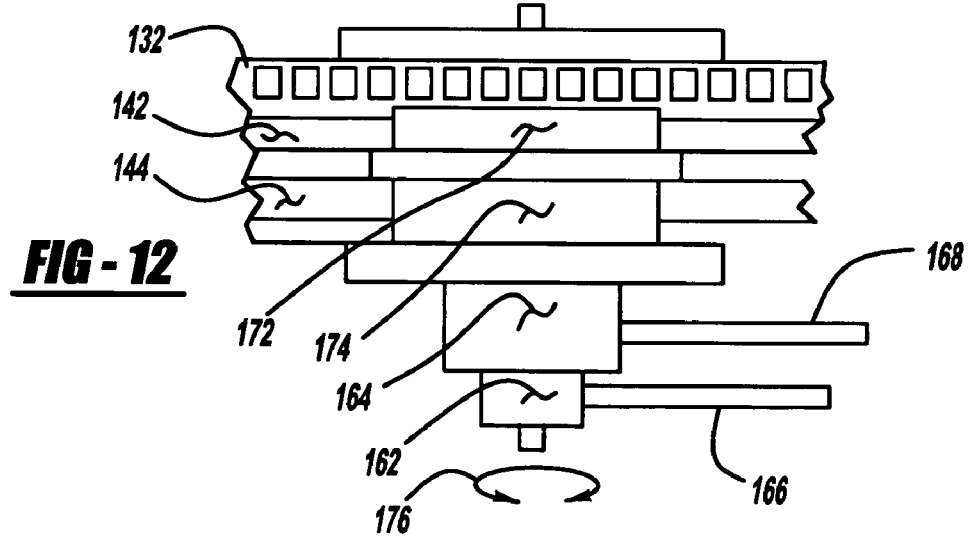
FIG. 12 is a side view of the pulley, cable and tensioning device of FIG. 11.

FIG. 11 is a top view of a tension post 160 that may be employed to deliver electricity from a PCB to a flexible cable 132, while FIG. 12 is a side view of the tension post 160 and the flexible cable 132. More specifically, the post 160 depicted in FIGS. 11 and 12, which is also shown in FIG. 8, may have an inner electrical hub 162 and an outer electrical hub 164 that make contact with a lower blade 166 and an upper blade 168, respectively. The lower and upper blades 166, 168 are made of an electrically conductive material that possesses springback or elastic recovery attributes. Materials such as copper, steel, brass and aluminum are examples of suitable blade materials.

Continuing, functionally the blades 166, 168 provide a force against the inner and outer electrical hubs 162, 164 due to their spring, and conduct electricity via a connector 170 from a PCB 54. The inner and outer hubs 162, 164 conduct electricity into the upper and lower protrusions 142, 144 via internal connections to conductor hubs 172, 174. The conductor hubs 172, 174, being electrically conductive, transmit electricity into the copper-plated protrusions 142, 144 of the flexible cable 132. Like the motor 128, the tension post 160 is capable of rotating clockwise and counterclockwise in accordance with direction arrow 176. A pointer, such as the pointer 22 depicted in FIG. 2, may reside on the flexible cable 132 of FIG. 12 and be illuminated by one or more LEDs that receive electrical power from the protrusions 142, 144. The belt 132 depicted in FIGS. 11 and 12 may be used in the speedometer arrangement depicted in FIG. 2 or the speedometer arrangement depicted in FIG. 7.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An indicating instrument comprising:
   a numerical scale having a perimeter;
   an electrically conductive belt;
   a pointer connected to the belt at one location on the belt to indicate different scale positions, the pointer maintaining a same position on and relative to the electrically conductive belt; and
   an LED located within the pointer to illuminate the pointer, the LED powered by the electrically conductive belt.

2. The indicating instrument of claim 1, further comprising:
   a display located inside the perimeter of the numerical scale.

3. The indicating instrument of claim 1, further comprising:
   a pulley; and
   a motor, the motor to drive the pulley and move the belt.

4. The indicating instrument of claim 1, further comprising:
   a separate pointer support structure having a dovetail receptacle; and
   a dovetail tongue protruding from the pointer that contacts the support structure within the dovetail receptacle as the pointer moves about the scale.

5. The indicating instrument of claim 1, further comprising:
   at least one electrical prong on the pointer; and
   at least one electrical receptacle on the belt, wherein the at least one electrical prong on the pointer lodges into the at least one electrical receptacle on the belt.

6. An indicating instrument comprising:
   a numerical scale;
   an LCD located within an interior perimeter of the numerical scale;
   an electrically conductive spool;
   an electrically conductive belt that contacts the electrically conductive spool;
   a pointer connected to the electrically conductive belt at one location on the belt that traverses outside of a perimeter of the LCD;
   an LED located within the pointer to illuminate the pointer, the LED powered by the electrically conductive belt; and
   a motor that drives the spool.

7. The indicating instrument of claim 6, wherein the pointer traverses outside of a perimeter of the numerical scale.

8. The indicating instrument of claim 6, further comprising:
   a tensioning post to provide tension in the belt.

9. The indicating instrument of claim 6, further comprising:
   a separate pointer support structure having a dovetail receptacle; and
   a dovetail tongue protruding from the pointer that contacts the support structure within the dovetail receptacle as the pointer moves about the scale.

10. The indicating instrument of claim 6, further comprising:
    at least one electrical prong on the pointer; and
    at least one electrical receptacle on the belt, wherein the at least one electrical prong on the pointer lodges into the at least one electrical receptacle on the belt.

11. The indicating instrument comprising:
    a scale;
    a pointer to indicate positions on the scale;
    a belt to which the pointer is connected at a single location on the belt, the belt defining perforations and having a copper plated area to conduct electricity from a tensioning post;
    a spool with teeth to coincide with the perforations in the belt that moves the belt, the spool supplying electricity to the cooper plated area of the belt;
    an LED located within the pointer to illuminate the pointer, the LED powered by the copper plated area of the belt;
    a bobbin around which the belt winds;
    a spring to spring-load the bobbin to maintain tension in the belt; and
    a motor to drive the spool.

12. The indicating instrument of claim 11, further comprising:
    a printed circuit board, wherein the spool is supplied with electricity from the printed circuit board.

13. The indicating instrument of claim 11, further comprising:
    a separate pointer support structure having a dovetail receptacle; and
    a dovetail tongue protruding from the pointer that contacts the support structure within the dovetail receptacle as the pointer moves about the scale.

14. The indicating instrument of claim 11, further comprising:
    at least one electrical prong on the pointer; and
    at least one electrical receptacle on the belt, wherein the at least one electrical prong on the pointer lodges into the at least one electrical receptacle on the belt.

15. The indicating instrument of claim 14, further comprising:
    an LCD located within an interior perimeter of the numerical scale, wherein the pointer traverses outside of a perimeter of the LCD.

* * * * *